(12) United States Patent
Gurumurthi et al.

(10) Patent No.: US 12,066,890 B2
(45) Date of Patent: Aug. 20, 2024

(54) ERROR-TOLERANT MEMORY SYSTEM FOR MACHINE LEARNING SYSTEMS

(71) Applicant: Advanced Micro Devices, Inc., Santa Clara, CA (US)

(72) Inventors: Sudhanva Gurumurthi, Austin, TX (US); Ganesh Suryanarayan Dasika, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/704,474

(22) Filed: Mar. 25, 2022

(65) Prior Publication Data

US 2023/0305923 A1 Sep. 28, 2023

(51) Int. Cl.
| | | |
|---|---|---|
| G11C 29/00 | (2006.01) | |
| G06F 11/07 | (2006.01) | |
| G06F 11/10 | (2006.01) | |
| G06N 20/00 | (2019.01) | |

(52) U.S. Cl.
CPC ........ G06F 11/1068 (2013.01); G06F 11/076 (2013.01); G06F 11/0772 (2013.01); G06F 11/1004 (2013.01); G06N 20/00 (2019.01)

(58) Field of Classification Search
CPC . G06F 11/1068; G06F 11/1004; G06F 11/076
See application file for complete search history.

(56) References Cited

U.S. PATENT DOCUMENTS

| | | | | |
|---|---|---|---|---|
| 11,205,498 | B1* | 12/2021 | Berman | G11C 7/06 |
| 2019/0227739 | A1* | 7/2019 | Khan | G06F 3/0604 |
| 2021/0064986 | A1* | 3/2021 | Xi | H03M 7/26 |
| 2021/0149763 | A1* | 5/2021 | Ranganathan | G06F 11/1064 |
| 2022/0165348 | A1* | 5/2022 | Zuolo | G06N 3/08 |
| 2022/0347853 | A1* | 11/2022 | Claussen | B25J 9/1697 |
| 2023/0061920 | A1* | 3/2023 | Bhardwaj | G06F 18/24323 |
| 2023/0266884 | A1* | 8/2023 | Lee | G06F 3/0619 |
| | | | | 711/103 |

OTHER PUBLICATIONS

"Blue Brain Project", EPFL [retrieved Nov. 16, 2021]. Retrieved from the Internet <https://www.epfl.ch/research/domains/bluebrain/>., May 2005, 5 Pages.
"Human Brain Project", Human Brain Project FPA [retrieved Nov. 16, 2021]. Retrieved from the Internet <https://www.humanbrainproject.eu/en/>., Oct. 1, 2013, 3 Pages.
Hassabis, Demis , et al., "Neuroscience-Inspired Artificial Intelligence", Neuron vol. 95, No. 2 [retrieved Nov. 16, 2021]. Retrieved from the Internet <https://sociales.uexternado.edu.co/wp-content/uploads/sites/11/2019/07/S-2-Ai_Neuroscience.pdf>., Jul. 19, 2017, 14 Pages.

* cited by examiner

*Primary Examiner* — Samir W Rizk
(74) *Attorney, Agent, or Firm* — FIG. 1 Patents

(57) ABSTRACT

A memory system uses error detection codes to detect when errors have occurred in a region of memory. A count of the number of errors is kept and a notification is output in response to the number of errors satisfying a threshold value. The notification is an indication to a host (e.g., a program accessing or managing a machine learning system) that the threshold number of errors have been detected in the region of memory. As long as the number of errors that have been detected in the region of memory remains under the threshold number no notification need be output to the host.

20 Claims, 5 Drawing Sheets

ERROR-TOLERANT MEMORY SYSTEM FOR MACHINE LEARNING SYSTEMS

BACKGROUND

Computer technology is regularly advancing, resulting in faster computers. One such area of advancement is memory where different types of memory are developed or implemented in different devices. These different types of memory and their implementations have various different fault rates.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
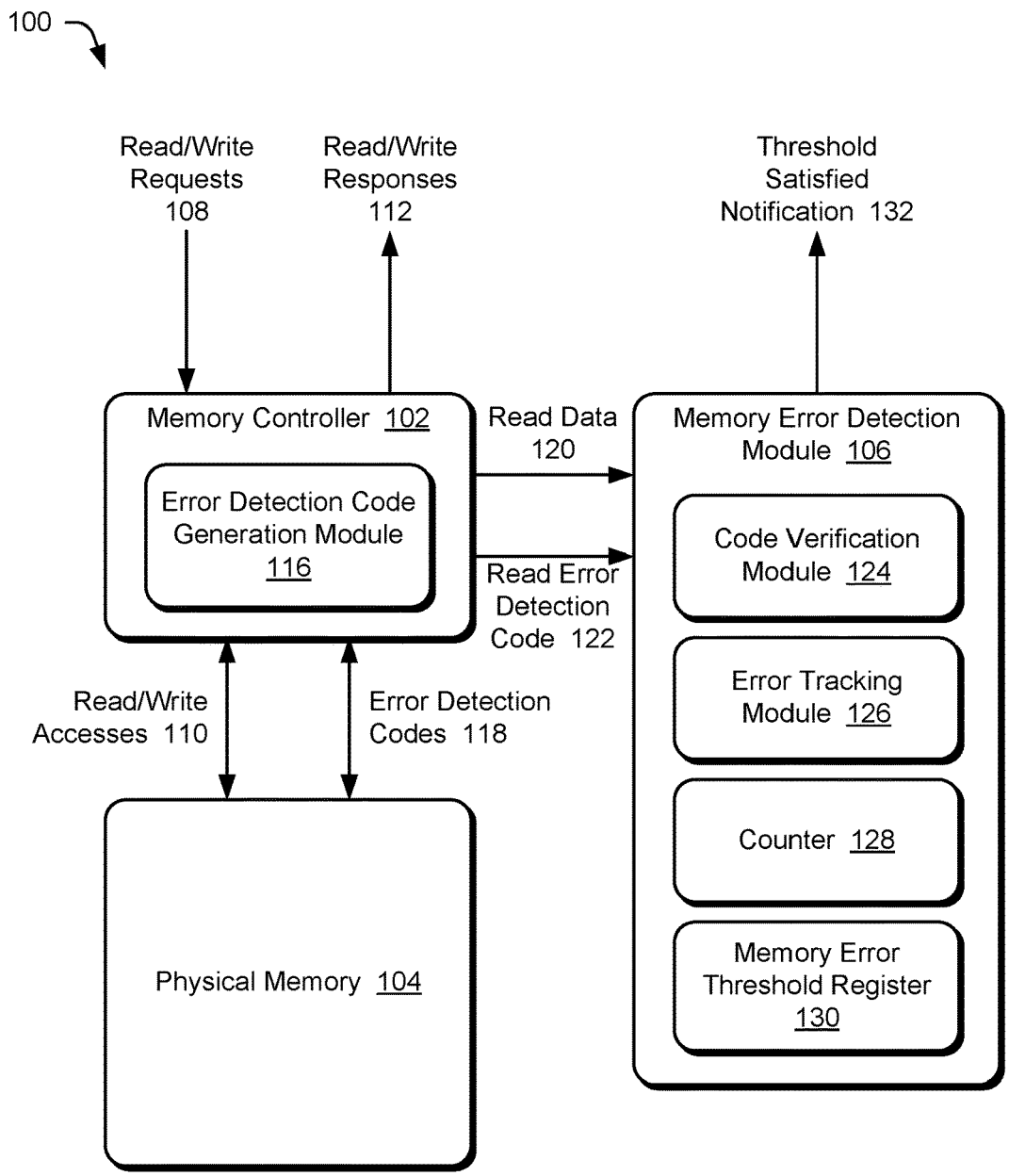
FIG. 1 is an illustration of a non-limiting example memory system that is operable to employ the error-tolerant memory system for machine learning systems described herein.

Machine learning system are executed on various different types of devices, including accelerators such as neuromorphic accelerators or analog artificial intelligence and machine learning (AI/ML) accelerators. Some of these devices use resistive memory, which improves performance of the devices while reducing energy usage relative to other non-resistive types of memory. However, one problem experienced with such devices is that resistive memories tend to have higher fault and defect rates compared to other non-resistive types of memory.

The techniques discussed herein include a memory system using error detection codes to detect when errors have occurred in a region of memory. A count of the number of errors is kept and a notification is output in response to the number of errors satisfying a threshold value. The notification is an indication to a host (e.g., a program accessing or managing the machine learning system) that the threshold number of errors have been detected in the region of memory. As long as the number of errors that have been detected in the region of memory remains under the threshold number no notification need be output to the host.

The memory system is thus tolerant of errors in the memory and notifies the host only after a threshold number of errors have been detected. The threshold number of errors is configurable, allowing a user of the accelerator to adjust the error tolerance of the memory system by changing the threshold number. Although these errors potentially alter results generated by the machine learning system, in practice a small number of errors typically has little to no user-noticeable affect on the results generated by the machine learning system. For example, if a region of memory is storing weights of neurons of a deep neural network having tens of thousands of neurons, errors in a few of these weights will oftentimes have little to no user-noticeable affect on the results generated by the deep neural network. Thus, the techniques discussed herein allow a small number of errors to be detected using error detection codes while notifying a host only if a larger number of errors (satisfying the threshold number of errors) is detected.

In some examples, the techniques described herein relate to a method comprising: detecting, using an error detection code, that an error has occurred in a region of physical memory of an accelerator executing a machine learning system; determining whether a threshold number of errors have been detected in the region of physical memory; and outputting, in response to the threshold number of errors having been detected, a notification that the threshold number of errors have been detected in the region of physical memory.

In some examples, the techniques described herein relate to a method, further comprising maintaining a count of detected errors in the region of physical memory and incrementing the count of detected errors in response to each occurrence of an error in the region of physical memory.

In some examples, the techniques described herein relate to a method, wherein the physical memory comprises non-volatile resistive memory.

In some examples, the techniques described herein relate to a method, wherein the error detection code is a parity code or a cyclic redundancy check code.

In some examples, the techniques described herein relate to a method, wherein the region of physical memory is one of multiple regions of physical memory, and the method further comprises, for each of the multiple regions of physical memory, maintaining a count of detected errors in the region of physical memory and incrementing the count of detected errors corresponding to the region of physical memory in response to each occurrence of an error in the region of physical memory.

In some examples, the techniques described herein relate to a method, wherein the region of physical memory is one of multiple regions of physical memory and the threshold number of errors is different for different ones of the multiple regions of physical memory.

In some examples, the techniques described herein relate to a method, wherein the detecting includes using the error detection code rather than an error correction code.

In some examples, the techniques described herein relate to a method, further comprising receiving, after outputting the notification, a request to initiate error correction for the region of physical memory, and performing, in response to the request, error correction for the region.

In some examples, the techniques described herein relate to a method, wherein the region of physical memory is one of multiple regions of physical memory, and the method further comprises performing error detection rather than error correction on other ones of the multiple regions of physical memory.

In some examples, the techniques described herein relate to a method, wherein the region of physical memory is a first region of multiple regions of physical memory and a first portion of the machine learning system is deployed to the first region, the method further comprising receiving, after outputting the notification, one or more requests to move the first portion of the machine learning system to a second region of the multiple regions of physical memory in which a second portion of the machine learning system is deployed, and to move the second portion of the machine learning system to the first region.

In some examples, the techniques described herein relate to a method, wherein the machine learning system comprises a deep neural network comprises multiple layers and each of the multiple layers is deployed to a different region of the multiple regions of physical memory.

In some examples, the techniques described herein relate to a system comprising: a code verification module to detect, using an error detection code, that an error has occurred in a region of physical memory of an accelerator executing a machine learning system; and an error tracking module to determine whether a threshold number of errors have been detected in the region of physical memory and to output, in response to the threshold number of errors having been detected, a notification that the threshold number of errors have been detected in the region of physical memory.

In some examples, the techniques described herein relate to a system, the system further comprising a memory controller to receive, after the notification is output, a request to initiate error correction for the region of physical memory, and perform, in response to the request, error correction for the region.

In some examples, the techniques described herein relate to a system, wherein the region of physical memory is one of multiple regions of physical memory, and the memory controller is further to perform error detection rather than error correction on other ones of the multiple regions of physical memory.

In some examples, the techniques described herein relate to a system, wherein the region of physical memory is a first region of multiple regions of physical memory and a first portion of the machine learning system is deployed to the first region, wherein the system further comprises a memory controller to receive, after the notification is output, one or more requests to move the first portion of the machine learning system to a second region of the multiple regions of physical memory in which a second portion of the machine learning system is deployed, and to move the second portion of the machine learning system to the first region.

In some examples, the techniques described herein relate to a system, wherein the machine learning system comprises a deep neural network including multiple layers and each of the multiple layers is deployed to a different region of the multiple regions of physical memory.

In some examples, the techniques described herein relate to a system, wherein the accelerator comprises a neuromorphic accelerator.

In some examples, the techniques described herein relate to a computing device comprising: a physical memory; and a memory error detection module to detect, using an error detection code, that an error has occurred in a region of the physical memory of to which a machine learning system has been deployed, determine whether a threshold number of errors have been detected in the region of physical memory, and output, in response to the threshold number of errors having been detected, a notification that the threshold number of errors have been detected in the region of physical memory.

In some examples, the techniques described herein relate to a computing device, wherein the physical memory comprises nonvolatile resistive memory.

In some examples, the techniques described herein relate to a computing device, wherein the region of physical memory is one of multiple regions of physical memory, and the memory error detection module is further to, for each of the multiple regions of physical memory, maintain a count of detected errors in the region of physical memory and increment the count of detected errors corresponding to the region of physical memory in response to each occurrence of an error in the region of physical memory.

FIG. 1 is an illustration of a non-limiting example memory system 100 that is operable to employ the error-tolerant memory system for machine learning systems described herein. The memory system 100 includes a memory controller 102, a physical memory 104, and a memory error detection module 106. In one or more implementations, the physical memory 104 is any of a variety of types of nonvolatile or volatile memory, including resistive memory. Examples of physical memory 104 include phase-change memory (PCM), magnetic tunnel junctions, memristors, static random access memory (SRAM), dynamic random access memory (DRAM), and so forth.

The memory system 100 is implementable in any of a variety of different types of computing devices. For example, the system 100 is implementable in a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television), an Internet of Things (IoT) device, an automotive computer, and so forth.

In one or more implementations, the memory system 100 is implemented in a neuromorphic accelerator that performs neuromorphic computing to execute deep neural networks or other machine learning systems. Neuromorphic computing refers to various different types of computing. By way of example, neuromorphic computing refers to biologically-inspired spiking neuron networks that learn through Hebbian approaches or broadly developing artificial intelligence techniques that are biologically inspired. By way of another example, neuromorphic computing refers to a brain-inspired processor that uses memory elements as synaptic storage and uses Ohm's Law and Kirchoff's Current Law to do highly parallel, analog computation, such as a matrix-vector product. By way of another example, neuromorphic computing refers to computer-driven simulation of the nervous system, augmenting traditional in-vitro and in-vivo methods of investigation, and enabling what-if studies. The neuromorphic accelerator is implementable in any of a variety of different types of computing devices discussed above.

A deep neural network refers to an artificial neural network that includes multiple layers between the input and output layers. The use of these multiple layers differentiates deep neural networks from other types of neural networks. The techniques discussed herein are able to leverage the presence of these multiple layers to move different layers of the deep neural network to different regions in the physical memory 104 as discussed in more detail below.

The memory controller 102 manages reading data from and writing data to the physical memory 104. The memory controller 102 receives read and write requests 108 and performs the corresponding read or write accesses 110 to the physical memory 104, returning any appropriate responses (e.g., the requested data for a read access, confirmation indication for a write access) as read and write responses 112. The memory controller 102 receives the read and write requests 108 from any of various sources, such as a host (e.g., a program) accessing or managing a machine learning system executing in the memory system 100, the operating system or other program of a computing device implementing the memory system 100, and so forth.

The memory controller 102 includes an error detection code generation module 116. In response to a write request 108, the error detection code generation module 116 generates and stores in the physical memory 104 an error detection code 118. The error detection code generation module 116 generates error detection codes using any of a variety of public or proprietary techniques, such as parity techniques that generate parity codes, cyclic redundancy check (CRC) techniques that generate CRC codes, and so forth. For data written to the physical memory 104 as part of a write access 110, the error detection code generation module 116 generates an error detection code 118 for the data and stores the error detection code in the physical memory 104 as associated with the written data.

When data is read from the physical memory 104 as part of a read access, the error detection code 118 associated with the data is also read by the memory controller 102. The read data is returned (e.g., to the host) as part of a read response 112. The read data is also provided to the memory error detection module 106 as read data 120 and the read error detection code is provided to the memory error detection module 106 as read error detection code 122.

The memory error detection module 106 includes a code verification module 124, an error tracking module 126, a counter 128, and a memory error threshold register 130. The code verification module 124 checks whether the error detection code 122 indicates an error in the read data 120 using the same error detection technique as was used by the error detection code generation module 116 to generate the error detection code stored in the physical memory 104. If the error detection code 122 indicates an error in the read data 120, then the error tracking module 126 increments the counter 128. In one or more implementations, the counter 128 is initialized (e.g., set to a value of 0) when a machine learning system is deployed to the physical memory 104 and is incremented (e.g., by a value of 1) each time the error detection code 122 indicates an error in the read data 120. Accordingly, the counter 128 maintains a count of detected errors in the physical memory 104.

The error tracking module 126 also monitors the counter 128 and determines whether the counter 128 satisfies (e.g., equals or exceeds) a value in the memory error threshold register 130. The value in the memory error threshold register 130 is a value indicating how many detected errors are acceptable before the memory error detection module 106 outputs an error notification. The value in the register 130 is set in any of a variety of different manners, such as by a designer or developer of a machine learning system deployed to the physical memory 104, by a user of the memory system 100 (e.g., a user of a host that receives results or outputs from a machine learning system deployed to the physical memory 104), and so forth.

Additionally or alternatively, the counter 128 is initialized to a value based on (e.g., equal to) the value in the memory error threshold register 130 when a machine learning system is deployed to the physical memory 104. In such situations, the counter 128 is decremented (e.g., by a value of 1) each time the error detection code 122 indicates an error in the read data 120, and the error tracking module 126 monitors the counter 128 and determines whether the counter 128 equals a particular value (e.g., 0). In such situations, the error tracking module 126 determines that the counter 128 satisfies the value in the register 130 when, e.g., the counter 128 is 0. Accordingly, in such situations the counter 128 maintains a count of how many errors in the physical memory 104 are to be detected before an error notification is output.

In response to determining that the counter 128 satisfies the value in the register 130, the memory error detection module 106 outputs a threshold satisfied notification 132. This threshold satisfied notification 132 is output to, for example, a host that deployed a machine learning system to the physical memory 104. The host or other recipient of the threshold satisfied notification 132 responds to the threshold satisfied notification 132 in any of a variety of different manners, as discussed in more detail below.

The memory error detection module 106 and memory controller 102 use an error detection technique rather than an error correction technique. An error detection technique detects errors but does not correct the errors. In contrast, an error correction technique corrects (and also typically detects) errors. Using an error detection technique improves the performance of the memory system 100 by allowing for higher performance resistive memories to be used in physical memory 104 and errors to occur in physical memory 104, and allowing continued operation of a machine learning system deployed to the physical memory 104 up until the threshold number of errors (as indicated by the value in the register 130) have been detected. Furthermore, this improves performance of and reduces power usage by the memory system 100 relative to employing an error correction technique because error detection techniques are typically simpler and involve fewer computations than error correction techniques.

Figure 2:
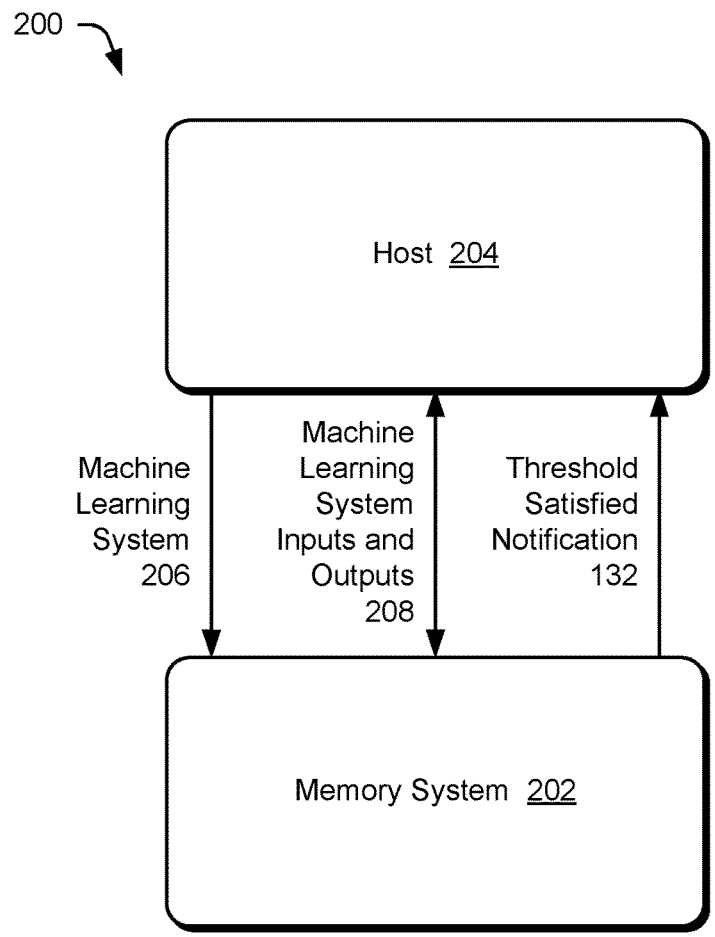
FIG. 2 illustrates an example system including a memory system and a host.

FIG. 2 illustrates an example system 200 including a memory system 202 and a host 204. The memory system 202 is, for example, the memory system 100 of FIG. 1. The host 204 is, for example, a program deploying a machine learning system to the memory system 202, a program accessing or managing a machine learning system deployed to the memory system 202, and so forth. Deploying the machine learning system 206 to the memory system 202 includes storing data (e.g., weights for various filters or neurons of the machine learning system 206) in the memory system 202. The host 204 is implemented in any of various manners, for example as part of an operating system of a device implementing the system 200, as an application running on a device implementing the system 200, in firmware or hardware, and so forth. The host 204 also provides inputs to and receives outputs 208 from the machine learning system deployed on the memory system 202. In one or more implementations, the host 204 also trains the machine learning system deployed on the memory system 202.

The host 204 also receives the threshold satisfied notification 132 from the memory system 202. The host 204 resolves the threshold satisfied notification 132 in any of a variety of different manners. In one or more implementations, in response to receiving the threshold satisfied notification 132 the host 204 sounds an alarm that an error in the memory system 202 has been detected (e.g., that the threshold number of errors have been detected). The alarm is, for example, an audio or visual notification to a user of the host 204, an interrupt to a system implementing the host 204, an error message packet (e.g., sent to a system implementing the host 204), and so forth. Additionally or alternatively, in response to receiving the threshold satisfied notification 132 the host 204 stores a record of the threshold satisfied notification 132, such as a timestamp of when the threshold number of errors were detected (e.g., a timestamp of when the threshold satisfied notification 132 was received). Additionally or alternatively, in response to receiving the threshold satisfied notification 132 the host 204 changes which portions of the machine learning system are deployed to different regions of the memory system 202 as discussed in more detail below.

Additionally or alternatively, in response to receiving the threshold satisfied notification 132, the host 204 activates or enables an error correction technique in the memory system 202. For example, the host 204 sends a request or command to the memory system 202 to initiate error correction for the memory system, and in response the memory system 202 (e.g., memory controller 102) begins performing error correction rather than error detection. The memory system 202 performs error correction using any of a variety of public or proprietary techniques, such as Hamming codes, Reed-Solomon codes, and so forth. Accordingly the additional time and power expended in performing error correction, or in taking any repair or hardware replacement actions, is delayed until the threshold number of errors have been detected.

Returning to FIG. 1, the error detection code generation module 116 generates the error detection code 118 for an amount of data written as part of a write access 110. The amount of data over which an error detection code 118 is generated varies by implementation, such as being a number of bytes (e.g., 32 bytes or 256 bytes) in a cache line of a device implementing the memory system 100, a smallest number of bytes that is writable or readable by the memory controller 102 at a time (e.g., 4 bytes or 16 bytes), and so forth.

Figure 3:
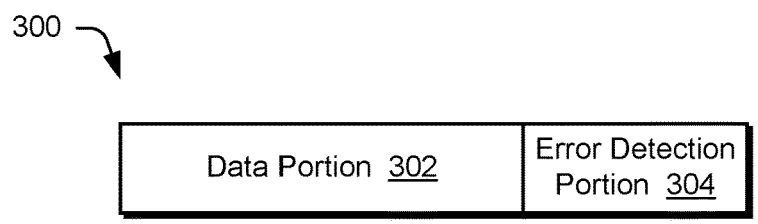
FIG. 3 illustrates an example of an error detection code stored in physical memory.

FIG. 3 illustrates an example 300 of an error detection code stored in physical memory 104. In the example 300, an amount of data (e.g., 4 bytes or 16 bytes) is stored in a data portion 302 of physical memory 104 and an error detection code corresponding to the data stored in the data portion 302 is stored in an error detection portion 304 of the physical memory 104. The error detection portion 304 is, for example, a number of memory cells adjacent to the memory cells storing the data portion 302.

Returning to FIG. 1, a single memory error threshold register 130 and a single counter 128 are illustrated that correspond to the physical memory 104. Accordingly, in the illustrated example of FIG. 1 the physical memory 104 is treated as a single region. Additionally or alternatively, the physical memory 104 includes multiple different regions and a different memory error threshold register and counter are associated with each of the multiple different regions. This allows multiple different threshold values to be set (e.g., a different threshold value for each region) and different threshold satisfied notifications to be output by the memory error detection module 106.

Figure 4:
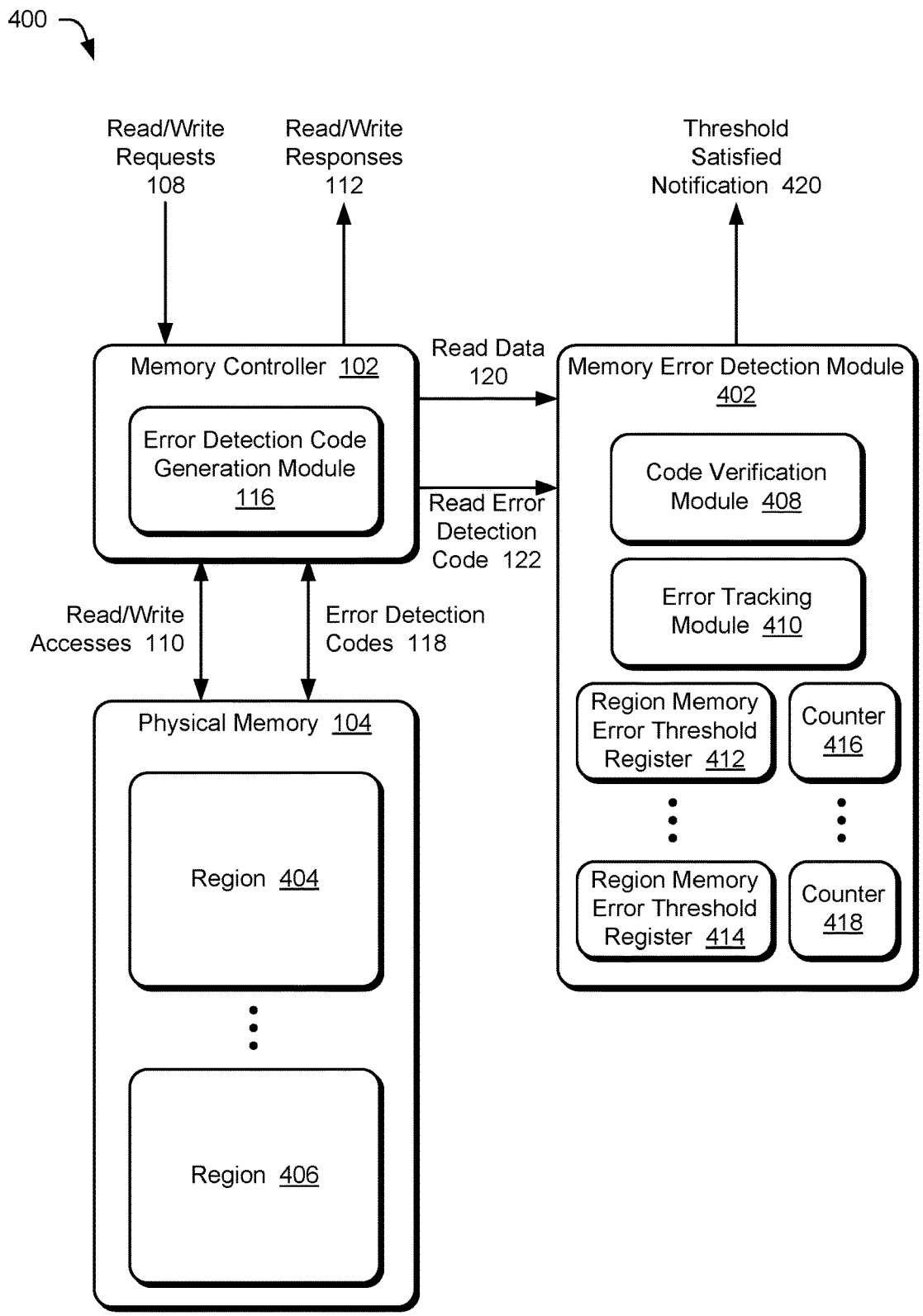
FIG. 4 is an illustration of a non-limiting example memory system that is operable to employ the error-tolerant memory system for machine learning systems described herein.

FIG. 4 is an illustration of a non-limiting example memory system 400 that is operable to employ the error-tolerant memory system for machine learning systems described herein. The memory system 400 includes the memory controller 102, the physical memory 104, and a memory error detection module 402. The memory system 400 is similar to the memory system 100 of FIG. 1 but differs in that the memory system 400 treats the physical memory 104 as including multiple regions and thus includes multiple different memory error threshold registers and counters for the multiple different regions of the physical memory 104.

As illustrated, the physical memory 104 includes multiple different regions 404 and 406. Although two regions 404 and 406 are illustrated in the memory system 400, it is to be appreciated that the physical memory 104 includes any number of regions. The regions in the physical memory 104 are defined in different manners, such as a group of memory cells (e.g., a single memory tile) in the physical memory 104 being a region, each memory array in the physical memory 104 being a region, each memory bank in the physical memory 104 being a region, and so forth. The various regions are the same or different sizes, and in one or more implementations the regions are defined based on the machine learning system deployed to the physical memory 104.

In one or more implementations, the memory system 400 is implemented in a neuromorphic accelerator that provides a programming interface exposed by the memory controller 102 or a compiler allowing specific portions of the machine learning system to be mapped to specific regions of the physical memory 104 and orchestrate the communication between the specific regions. A host uses this programming interface or compiler to map specific parts of the machine learning system onto specific regions of the physical memory 104 and orchestrate the communication between the regions.

By way of example, assume a host deploys a deep neural network to the physical memory 104 that includes multiple layers including several hidden layers. The host has knowledge of the layout of the physical memory 104 and as part of the deployment the host specifies which portions of the deep neural network are to be stored in which regions of the physical memory 104. E.g., the host specifies which region (e.g., which address range) each of the multiple layers of the deep neural network is to be deployed to.

The memory error detection module 402 is analogous to the memory error detection module 106 discussed above, except that memory error detection module 402 includes multiple region memory error threshold registers each having a corresponding counter. Although the memory error detection module 402 is illustrated as including two region memory error threshold registers 412 and 414 having corresponding counters 416 and 418, it is to be appreciated that the memory error detection module 402 includes any number of memory error threshold registers and corresponding counters.

The memory error detection module 402 receives the read data 120 and the error detection code 122 as discussed above, and the code verification module 408 checks whether the error detection code 122 indicates an error in the read data 120 as discussed above. The memory error detection module 402 also receives an indication of the region from which the read data 120 was read in any of a variety of manners. In one or more implementations, the memory error detection module 402 receives an indication of the regions (e.g., address ranges of the regions) in the physical memory 104 from the host and receives from the memory controller 102 an indication of the addresses or address range from which the read data 120 was read. Additionally or alternatively, the memory controller 102 is configured (e.g., by the host) with the address ranges of each region in the physical memory 104 (e.g., address ranges of each of the regions) and the memory controller 102 provides to the memory error detection module 402, for the read data 120, an indication of the region from which the read data 120 was read.

The memory error detection module 106 includes a counter for each region of the physical memory 104 and if the error detection code 122 indicates an error in the read data 120, then the error tracking module 410 increments the counter corresponding to that region. In one or more implementations, the counters 416 and 418 are each initialized (e.g., set to a value of 0) when a machine learning system is deployed to the physical memory 104 and each time the error detection code 122 indicates an error in the read data 120 the memory error detection module 402 increments (e.g., by a value of 1) the counter corresponding to the region from which the read data 120 was read. Accordingly, the counters 416 and 418 maintain a count of detected errors in the corresponding regions of physical memory 104.

The memory error detection module 106 also monitors the counters 416 and 418 and determines whether one or more of the counters 416 and 418 satisfy (e.g., equal or exceed) a value in the corresponding region memory error threshold register 412 or 414. The value in each of the region memory error threshold registers 412 and 414 is a value indicating how many detected errors are acceptable in the corresponding region of the physical memory 104 before the memory error detection module 402 outputs an error notification. The values in the registers 412 and 414 are set in any of a variety of different manners, such as by a designer or developer of a machine learning system deployed to the physical memory 104, by a user of the memory system 400 (e.g., a user of a host that receives results or outputs from a machine learning system deployed to the physical memory 104), and so forth.

Additionally or alternatively, the counters 416 and 418 are initialized to a value based on (e.g., equal to) the value in the corresponding region memory error threshold register 412 and 414 when a machine learning system is deployed to the physical memory 104. In such situations, the counter 416 or 418 is decremented (e.g., by a value of 1) each time the error detection code 122 indicates an error in the read data 120, and the error tracking module 410 monitors the counters 416 and 418 and determines whether one or more of the counters 416 and 418 equal a particular value (e.g., 0). In such situations, the error tracking module 410 determines that the counter 416 or 418 satisfies the value in the corresponding register 412 or 414 when, e.g., the counter 128 is 0. Accordingly, in such situations the counters 416 and 418 each maintain a count of how many errors in the corresponding region of physical memory 104 are to be detected before an error notification is output.

In response to determining that a counter 416 or 418 satisfies a value in the corresponding region memory error threshold register 412 or 414, the memory error detection module 402 outputs a threshold satisfied notification 420, which is an error notification for the corresponding region of physical memory 104. The threshold satisfied notification 420 is analogous to the threshold satisfied notification 132 discussed above but includes an indication of which region of physical memory 104 the region memory error thread register was satisfied.

In one or more implementations, different region memory error threshold registers have different values. This allows a threshold satisfied notification 420 to be output in response to different numbers of errors being detected in the corresponding regions. For example, assume that the host knows that certain portions (e.g., layers of a deep neural network) are more tolerant to errors than other portions and that the region 404 corresponding to the region memory error threshold register 412 is more error tolerant than the region 406 corresponding to the region memory error threshold register 414. In this example, the host sets the region memory error threshold register 412 to a higher threshold value than the region memory error threshold register 414. Accordingly, more errors are able to be detected in the region corresponding to the region memory error threshold register 412 before the threshold satisfied notification 420 is output than are able to be detected in the region corresponding to the region memory error threshold register 414 before the threshold satisfied notification 420 is output.

A host, such as the host 204 of FIG. 2, takes any of a variety of different actions in response to the threshold satisfied notification 420. In one or more implementations, the host deploys different portions of a machine learning system (e.g., different layers of a deep neural network) to different regions of the physical memory 104. The host changes which portion of the machine learning system is deployed to which region of the physical memory 104 in response to receiving a threshold satisfied notification 420. In response to receiving a threshold satisfied notification 420 for a region, the host moves the region for which the threshold satisfied notification 420 was received to a different region in the physical memory 104, also referred to as a target region. If a different portion of the machine learning system was already deployed to the target region, that portion is moved to the region for which the threshold satisfied notification 420 was received.

The determination of which region of the physical memory 104 is the target region for a portion of the machine learning system is based on any of a variety of different factors. In one or more implementations, the host identifies as a target region a region of the physical memory 104 having a smallest corresponding count of detected memory errors (e.g., a counter 416 or 418 of FIG. 4). Additionally or alternatively, the host identifies as a target region a region of the physical memory 104 having a corresponding count of detected memory errors (e.g., a counter 416 or 418 of FIG. 4) that is below a threshold amount (e.g., less than 50% of the region memory error threshold register setting for the region for which the threshold satisfied notification 420 was received). Additionally or alternatively, if there is a region in the physical memory 104 that is not currently being used (e.g., no portion of the machine learning system is deployed to the region) then the host selects that unused region as the target region.

Figure 5:
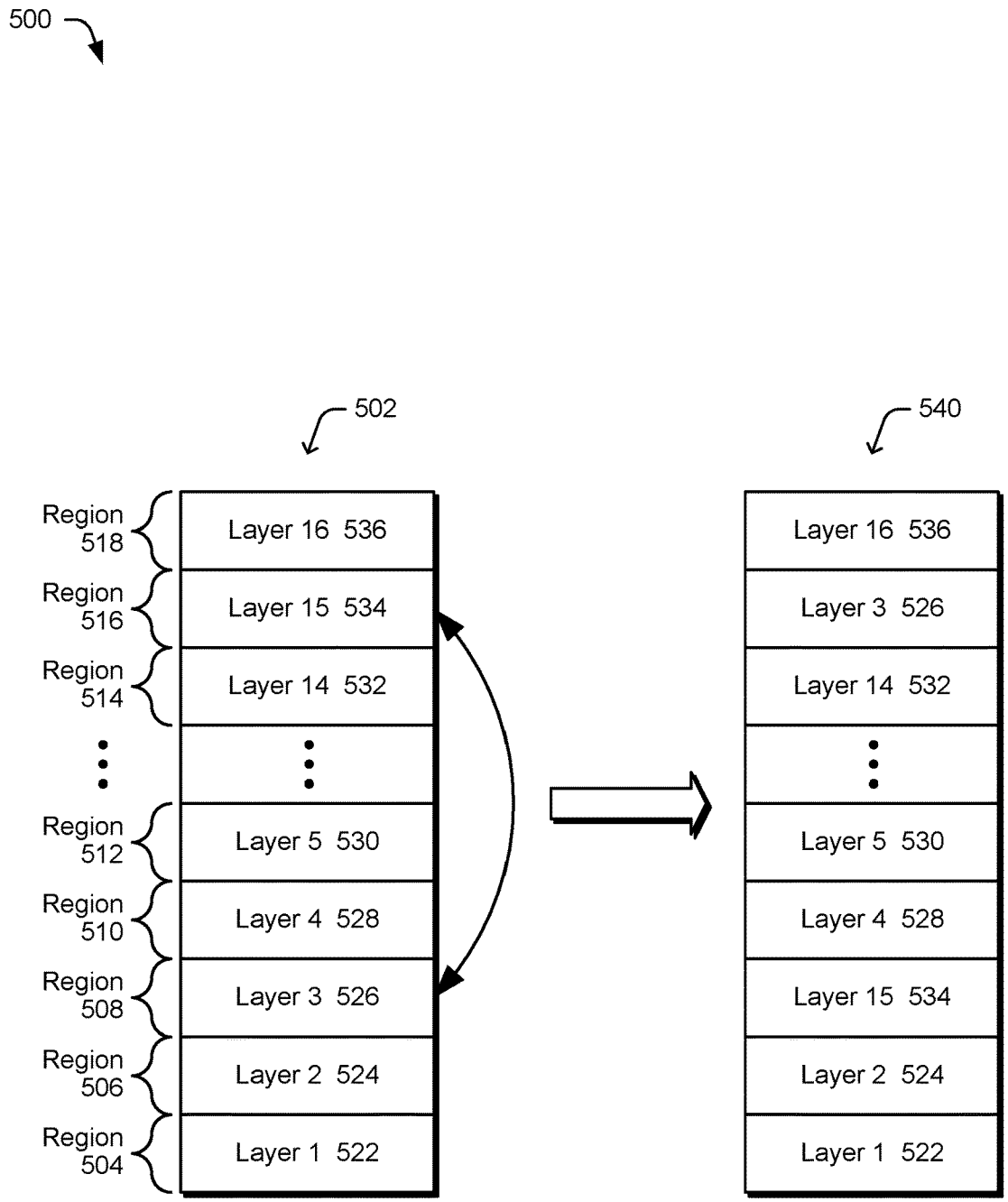
FIG. 5 illustrates an example of moving portions of a machine learning system to different regions of memory.

FIG. 5 illustrates an example 500 of moving portions of a machine learning system to different regions of memory. In the example 500, a deep neural network including 16 layers is deployed to physical memory. As illustrated at 502, each layer of the deep neural network is treated as a portion of the deep neural network. The physical memory has multiple regions, illustrated as regions 504, 506, 508, 510, 512, 514, 516, and 518. Each layer of the deep neural network is deployed to one of the multiple regions. As illustrated at 502, a first layer 522 is deployed to region 504, a second layer 524 is deployed to region 506, a third layer 526 is deployed to region 508, a fourth layer 528 is deployed to region 510, a fifth layer 530 is deployed to region 512, a fourteenth layer 532 is deployed to region 514, a fifteenth layer 534 is deployed to region 516, a sixteenth layer 536 is deployed to region 518, and so forth.

Assume in the example 500 that the number of detected errors for layer 534 exceeds the threshold value in the region memory error threshold register for region 516. In response to the threshold satisfied notification 420, the host identifies region 508 as a target region for layer 534 for any of various reasons, such as the number of errors detected for region 508 being less than the number of errors detected for region 516 and the threshold value in the region memory error threshold register corresponding to region 508 being higher than the threshold value in the region memory error threshold register corresponding to region 516. The host swaps layers 526 and 534, putting layer 534 in region 508 and layer 526 in region 516, as illustrated at 540. By changing the regions in which the layers 526 and 534 are deployed, layer 534 is moved to a region for which fewer errors have been detected, and layer 526 (which is more tolerant of errors as reflected by the threshold value in the region memory error threshold register corresponding to region 508) is moved to a region for which more errors have been detected. It should be noted that when swapping two layers, the threshold values in the region memory error threshold registers corresponding to the regions to which the two layers are deployed are also swapped.

Returning to FIG. 4, additionally or alternatively the host takes one or more other actions in response to the threshold satisfied notification 420. For example, the host sounds an alarm that the threshold number of errors have been detected in the region or stores a record of the threshold satisfied notification 420. By way of another example, the host activates or enables an error correction technique in the memory system 400. E.g., the host performs a hardware reset to clear out the state of at least the region for which the threshold number of errors have been detected (or optionally all of physical memory 104), changes the error detection algorithm in the memory controller 102 to an error correction algorithm that corrects errors, reloads the physical memory 104 that was cleared, and then resumes using the memory controller 102 and the physical memory 104. The error detection code generation module 116 also optionally ceases performing error detection for the region. In one or more implementations the memory controller 102 performs error correction on the region for which the count of detected errors satisfied the region memory error threshold register value. Error detection rather than error correction continues to be performed on other regions of the physical memory 104 for which the count of detected errors has not satisfied the region memory error threshold register value. Additionally or alternatively, the memory controller 102 performs error correction on all regions of the physical memory 104 in response regardless of the region for which the count of detected errors satisfied the region memory error threshold register value.

The techniques discussed herein simplify the reliability, availability, and serviceability (RAS) aspects of the various systems discussed herein (e.g., system 100 of FIG. 1, system 200 of FIG. 2, system 400 of FIG. 4) in various different manners. For example, a count of the number of errors is kept and a notification is output in response to the number of errors satisfying a threshold value. This allows the system to keep running with acceptable reliability and without correcting errors until the threshold value is reached. If the threshold value is not reached, a host need not receive any notification that the errors occurred and need take no action to resolve any such notification. By way of another example, error correction techniques need not be used (e.g., optionally until the threshold value is reached). Accordingly, the systems have an acceptable level of reliability while not incurring the expense (e.g., processing power or power usage) and complexity of using error correction techniques.

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. Furthermore, although various operations performed by one or more devices are recited, the techniques discussed herein additionally or alternatively include additional operations. In portions of the following discussion, reference is made to FIGS. 1-5.

Figure 6:
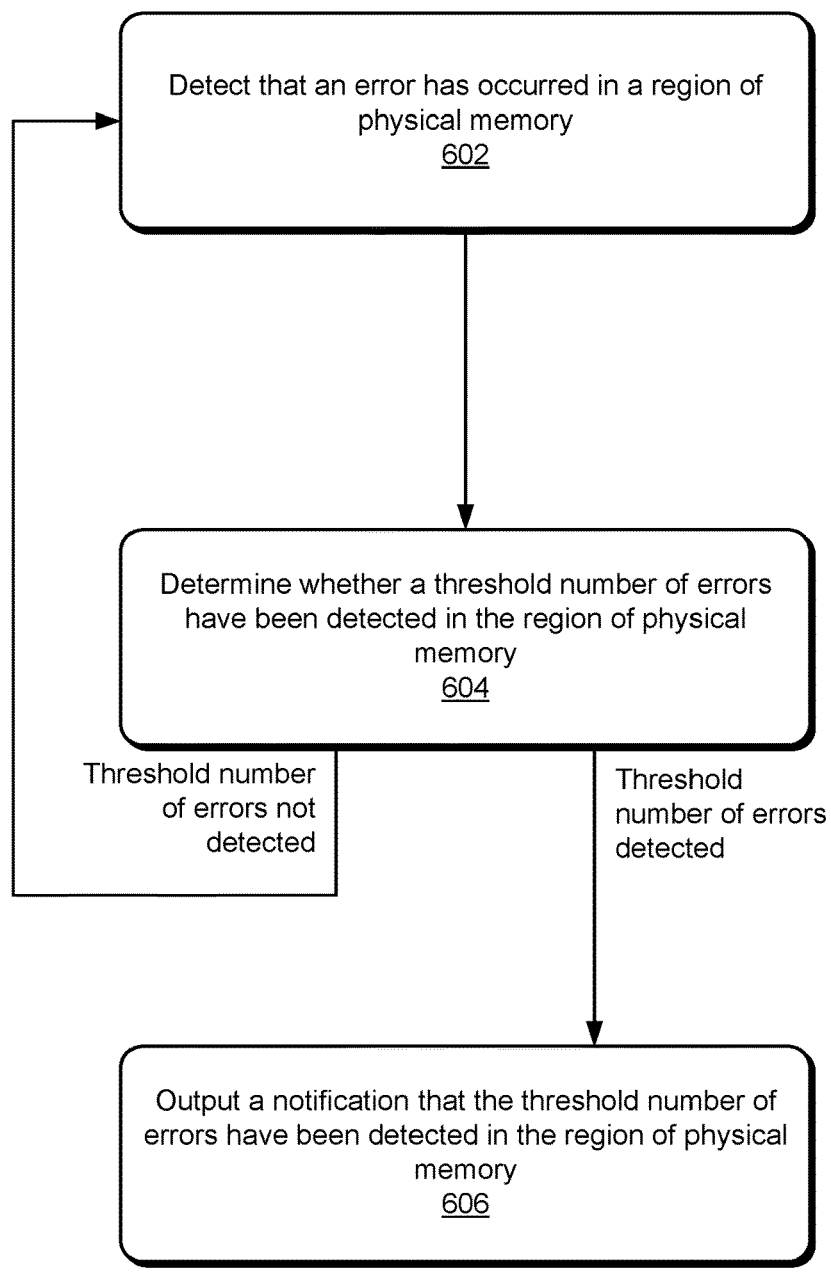
FIG. 6 is a flow diagram depicting a procedure in an example implementation of an error-tolerant memory system for machine learning systems.

FIG. 6 is a flow diagram 600 depicting a procedure in an example implementation of an error-tolerant memory system for machine learning systems. The flow diagram 600 is performed, for example, by a memory error detection module such as memory error detection module 106 of FIG. 1 or memory error detection module 402 of FIG. 4.

In this example, the occurrence of an error in a region of physical memory is detected (block 602). In one or more implementations, the physical memory is a single region, so the region of physical memory includes all of the physical memory. Additionally or alternatively, the region of physical memory is one or multiple regions of physical memory. The physical memory is, for example, physical memory in an accelerator (e.g., a neuromorphic accelerator) executing a machine learning system.

A determination is made as to whether a threshold number of errors have been detected in the region of physical memory (block 604). In one or more implementations, the threshold number of errors is greater than one and is a value stored in a memory error threshold register.

If the threshold number of errors have not been detected in the region of physical memory, the flow returns to block 602 to detect another error. However, in response to the threshold number of errors being detected in the region of physical memory, a notification that the threshold number of errors have been detected in the region of physical memory is output (block 606). The notification is output to a host (e.g., that deploys a machine learning system to the physical memory, or that accesses or manages a machine learning system deployed to the physical memory).

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the memory controller 102, the memory error detection module 106, the host 204, and the memory error detection module 402) are implemented in any of a variety of different manners such as hardware circuitry, software executing or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving an error detection code that indicates an error has occurred within a region of physical memory in an accelerator executing a machine learning system;
determining whether a threshold number of errors have been detected within the region of physical memory; and
outputting, in response to the threshold number of errors having been detected, a notification that the threshold number of errors have been detected within the region of physical memory.

2. The method of claim 1, further comprising maintaining a count of detected errors within the region of physical memory and incrementing the count of detected errors in response to each occurrence of an error within the region of physical memory.

3. The method of claim 1, wherein the physical memory comprises nonvolatile resistive memory.

4. The method of claim 1, wherein the error detection code is a parity code or a cyclic redundancy check code.

5. The method of claim 1, wherein the region of physical memory is one of multiple regions of physical memory, and the method further comprises, for each of the multiple regions of physical memory, maintaining a count of detected errors within the region of physical memory and incrementing the count of detected errors corresponding to the region of physical memory in response to each occurrence of an error within the region of physical memory.

6. The method of claim 1, wherein the region of physical memory is one of multiple regions of physical memory and the threshold number of errors is different for different ones of the multiple regions of physical memory.

7. The method of claim 1, wherein the receiving includes receiving the error detection code rather than an error correction code.

8. The method of claim 1, further comprising receiving, after outputting the notification, a request to initiate error correction for the region of physical memory, and performing, in response to the request, error correction for the region.

9. The method of claim 8, wherein the region of physical memory is one of multiple regions of physical memory, and the method further comprises performing error detection rather than error correction on other ones of the multiple regions of physical memory.

10. The method of claim 1, wherein the region of physical memory is a first region of multiple regions of physical memory and a first portion of the machine learning system is deployed to the first region, the method further comprising receiving, after outputting the notification, one or more requests to move the first portion of the machine learning system to a second region of the multiple regions of physical memory in which a second portion of the machine learning system is deployed, and to move the second portion of the machine learning system to the first region.

11. The method of claim 10, wherein the machine learning system comprises a deep neural network including multiple layers and each of the multiple layers is deployed to a different region of the multiple regions of physical memory.

12. A system comprising:
a code verification module to receive an error detection code that indicates an error has occurred within a region of physical memory in an accelerator executing a machine learning system; and
an error tracking module to determine whether a threshold number of errors have been detected within the region of physical memory and to output, in response to the threshold number of errors having been detected, a notification that the threshold number of errors have been detected within the region of physical memory.

13. The system of claim 12, further comprising a memory controller to receive, after the notification is output, a request to initiate error correction for the region of physical memory, and perform, in response to the request, error correction for the region.

14. The system of claim 13, wherein the region of physical memory is one of multiple regions of physical memory, and the memory controller is further configured to perform error detection rather than error correction on other ones of the multiple regions of physical memory.

15. The system of claim 12, wherein the region of physical memory is a first region of multiple regions of physical memory and a first portion of the machine learning system is deployed to the first region, wherein the system further comprises a memory controller to receive, after the notification is output, one or more requests to move the first portion of the machine learning system to a second region of the multiple regions of physical memory in which a second portion of the machine learning system is deployed, and to move the second portion of the machine learning system to the first region.

16. The system of claim 15, wherein the machine learning system comprises a deep neural network including multiple layers and each of the multiple layers is deployed to a different region of the multiple regions of physical memory.

17. The system of claim 12, wherein the accelerator comprises a neuromorphic accelerator.

18. A computing device comprising:
a physical memory in an accelerator; and
a memory error detection module to receive an error detection code that indicates an error has occurred within a region of the physical memory to which a machine learning system has been deployed, determine whether a threshold number of errors have been detected within the region of physical memory, and output, in response to the threshold number of errors having been detected, a notification that the threshold number of errors have been detected within the region of physical memory.

19. The computing device of claim 18, wherein the physical memory comprises nonvolatile resistive memory.

20. The computing device of claim 18, wherein the region of physical memory is one of multiple regions of physical memory, and the memory error detection module is further to, for each of the multiple regions of physical memory, maintain a count of detected errors within the region of physical memory and increment the count of detected errors corresponding to the region of physical memory in response to each occurrence of an error in the region of physical memory.

* * * * *